(12) United States Patent
McLeod et al.

(10) Patent No.: US 7,778,746 B2
(45) Date of Patent: Aug. 17, 2010

(54) CONTROL AND DIAGNOSTICS SYSTEM AND METHOD FOR VEHICLES

(75) Inventors: Paul W. McLeod, Martinez, GA (US); Kenneth McClymonds, Augusta, GA (US); George T. Hummert, Aiken, SC (US); Norman R. Padgett, Evans, GA (US); Russell King, Evans, GA (US)

(73) Assignee: Club Car, Inc., Evans, GA (US)

( * ) Notice: Subject to any disclaimer, the term of this patent is extended or adjusted under 35 U.S.C. 154(b) by 1235 days.

(21) Appl. No.: 10/508,046

(22) PCT Filed: Mar. 18, 2003

(86) PCT No.: PCT/US03/08090

§ 371 (c)(1),
(2), (4) Date: Jul. 18, 2005

(87) PCT Pub. No.: WO03/081538

PCT Pub. Date: Oct. 2, 2003

(65) Prior Publication Data

US 2006/0052918 A1  Mar. 9, 2006

Related U.S. Application Data

(60) Provisional application No. 60/365,339, filed on Mar. 18, 2002.

(51) Int. Cl.
*G06F 9/50* (2006.01)
*H02J 7/00* (2006.01)
*G06F 7/00* (2006.01)

(52) U.S. Cl. .............. 701/22; 701/29; 701/33; 320/137; 320/109; 320/138; 705/8; 705/10; 705/13

(58) Field of Classification Search .............. 705/8, 705/10, 13; 701/29, 35, 30, 22, 33; 340/455; 700/101, 99, 108; 320/120, 138, 150, 109, 320/137, 124, 155; 180/65.29
See application file for complete search history.

(56) References Cited

U.S. PATENT DOCUMENTS 5,349,535 A * 9/1994 Gupta .................. 702/63
(Continued)

FOREIGN PATENT DOCUMENTS

DE    198 53 456 A 1    7/1999
(Continued)

*Primary Examiner*—Thomas G Black
*Assistant Examiner*—Christine M Behncke
(74) *Attorney, Agent, or Firm*—Michael Best & Friedrich LLP

(57) ABSTRACT

An apparatus and method for a remote diagnostic system for motorized vehicles. Apparatus according to this aspect of the invention includes a base station having a processor associated with a transceiver and a remote unit installed in a vehicle. The remote unit includes a controller associated with a transceiver, where the controller gathers diagnostic data. The remote unit controller transmits a vehicle identification signal in conjunction with diagnostic data to the base station transceiver such that the base station processor monitors the diagnostic data for the vehicle. Another aspect of the invention further includes a mapping processor associated with a memory. The memory stores a virtual map of a local operating area having areas that are allowable and restricted. The controller is coupled to the mapping processor and a GPS (Global Positioning System) receiver is coupled to the mapping processor. The GPS receiver determines a current vehicle location and the mapping processor correlates the current vehicle location to a corresponding location on the virtual map. The mapping processor determines whether the vehicle is in a restricted area. The vehicle transceiver is configured to transmit a vehicle identification signal and location to the base station transceiver such that the base station processor monitors the location and status for each of the motorized vehicles.

44 Claims, 13 Drawing Sheets

U.S. PATENT DOCUMENTS

| | | | |
|---|---|---|---|
| 5,623,194 A * | 4/1997 | Boll et al. | 320/137 |
| 5,631,536 A * | 5/1997 | Tseng | 320/137 |
| 5,650,710 A * | 7/1997 | Hotta | 320/128 |
| 5,732,074 A | 3/1998 | Spaur et al. | |
| 5,803,215 A * | 9/1998 | Henze et al. | 191/2 |
| 5,892,346 A * | 4/1999 | Moroto et al. | 318/587 |
| 6,087,805 A * | 7/2000 | Langston et al. | 320/109 |
| 6,101,433 A * | 8/2000 | Flicker, Jr. | 701/35 |
| 6,185,487 B1 * | 2/2001 | Kondo et al. | 701/22 |
| 6,339,736 B1 * | 1/2002 | Moskowitz et al. | 701/29 |
| 6,826,460 B2 * | 11/2004 | Kittell et al. | 701/22 |
| 6,941,197 B1 * | 9/2005 | Murakami et al. | 701/22 |
| 6,952,680 B1 * | 10/2005 | Melby et al. | 705/28 |
| 7,171,381 B2 * | 1/2007 | Ehrman et al. | 705/28 |
| 7,239,965 B2 | 7/2007 | Wehrlen et al. | |
| 7,256,516 B2 * | 8/2007 | Buchanan et al. | 307/62 |
| 2002/0184078 A1 * | 12/2002 | Uyeki | 705/10 |
| 2003/0038637 A1 * | 2/2003 | Bertness et al. | 324/426 |
| 2004/0044452 A1 * | 3/2004 | Bauer et al. | 701/33 |

FOREIGN PATENT DOCUMENTS

| | | |
|---|---|---|
| DE | 100 32 020 A 1 | 1/2002 |
| DE | 10032020 | 1/2002 |
| EP | 1 081 670 A2 | 3/2001 |
| EP | 1 081 670 A3 | 11/2002 |
| JP | 61150853 | 7/1986 |
| JP | 81190698 | 7/1996 |
| JP | 10024784 | 1/1998 |
| JP | 10056989 | 9/1999 |
| JP | 11272995 | 10/1999 |
| WO | WO 02/17184 A1 | 2/2002 |

* cited by examiner

CONTROL AND DIAGNOSTICS SYSTEM AND METHOD FOR VEHICLES

RELATED APPLICATIONS

This application is a 371 of PCT/US2003/008090, filed on Mar. 18, 2003, which claims the benefit of U.S. Provisional Patent Application 60/365,339, filed on Mar. 18, 2002.

BACKGROUND

The present invention relates to motorized vehicles. More particularly, the invention relates to apparatus and methods for control and remote monitoring of motorized vehicles.

Today's motorized vehicles exhibit a high degree of intelligence. Most vehicles contain one or more processors that provide control over essential operating systems such as mechanical braking and engine management controls, to non-essential systems such as ventilation. With this intelligence comes a limited form of data acquisition. If a fault were to occur in a system or subsystem, a fault code is dispatched to a central processor located in the vehicle where the fault is logged and annunciated for a user to take action. The action is usually to return the vehicle to a service center to have a service technician extract and translate the fault code.

A processor is usually employed to monitor and store in memory parameters that can be uploaded to a hand-held device specifically for that purpose. Service technicians routinely provide preventive maintenance or perform service calls to diagnose reported problems using these devices. The handheld device can also be used to interrogate certain components to test for proper operation. However, for the majority of vehicles, this is a manual operation. Most vehicle data acquisition systems are not automated communication processes by which data is collected remotely and transmitted over a communication medium to receiving equipment for monitoring and analysis.

Data recorders have also made their way into motor vehicles. Data recorders play an essential role in preserving the acquired data. Unfortunately, the most common in use today is for analyzing accidents. Information such as velocity, braking and other control parameters are recorded with a time stamp and later retrieved for analysis.

Services such as OnStar™ (www.onstar.com) provide telephony in conjunction with the global positioning system (GPS). This subscription service is used for applications ranging from tracking a stolen vehicle, communicating directions to a driver or remotely retrieving codes from an engine controller to diagnose engine trouble or unlock car doors. However, this is only provided when personal safety is at risk or when initiated by a user.

For preventive maintenance or for trouble shooting, a trained technician or mechanic must be physically present in order to measure vehicle performance and observe malfunctions. While the handheld device described above greatly assists the technician, the device must be used at the vehicle. For large vehicle fleets, manual inspection is very time consuming.

In conjunction with ascertaining the health of a motorized vehicle, automated control is almost nonexistent. Limited vehicle control is available today, mostly in the form of radar collision avoidance. Control of the vehicle is left strictly to the user with little or no supervening input by a control system. While GPS navigation is available on many upscale vehicles, its role is limited to vehicle location and giving directions.

SUMMARY

The inventors have discovered that it would be desirable to have a system and method to monitor a vehicle in real time for vehicle operation, control, performance, maintenance and problem diagnosis. One aspect of the invention provides apparatus and methods for a remote diagnostic system for motorized vehicles. Apparatus according to this aspect of the invention includes a base station having a processor associated with a transceiver and a remote unit installed in a vehicle. The remote unit includes a controller associated with a transceiver, where the controller gathers diagnostic data. The remote unit controller transmits a vehicle identification signal in conjunction with diagnostic data to the base station transceiver such that the base station processor monitors the diagnostic data for the vehicle.

Another aspect of the invention further includes a mapping processor associated with a memory. The memory stores a virtual map of a local operating area having areas that are allowable and restricted. The controller is coupled to the mapping processor and a GPS receiver is coupled to the mapping processor. The GPS receiver determines a current vehicle location and the mapping processor correlates the current vehicle location to a corresponding location on the virtual map. The mapping processor determines whether the vehicle is in a restricted area. The vehicle transceiver is configured to transmit a vehicle identification signal and location to the base station transceiver such that the base station processor monitors the location and status for each of the motorized vehicles.

Other objects and advantages of the apparatus and method will become apparent to those skilled in the art after reading the detailed description of the preferred embodiment.

DETAILED DESCRIPTION OF THE PREFERRED EMBODIMENTS

Figure 1:
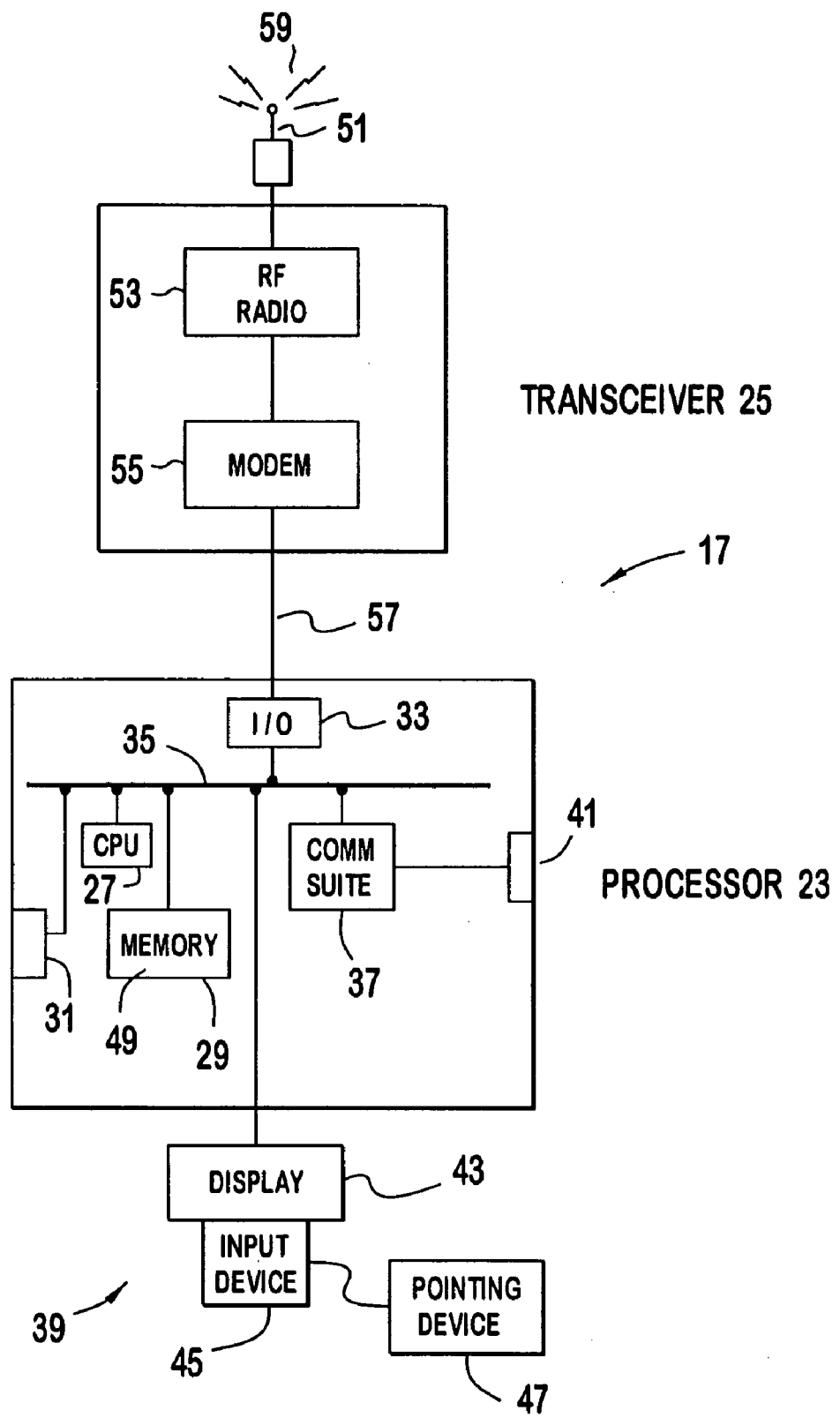
FIG. 1 is a block diagram of an exemplary embodiment of a base station in accordance with the invention.

Embodiments of the invention will be described with reference to the accompanying drawing figures wherein like numbers represent like elements throughout. One application of the invention is with an electric vehicle, namely a battery powered golf cart, for illustrating the system and method of the invention. However, the invention may be used with other vehicles such as NEVs (Neighborhood Electric Vehicles), petroleum powered vehicles, hybrid vehicles as well as vehicles using alternate energy sources. Additionally, to thoroughly illustrate the use of the invention, the description that follows refers to a typical, prior art golf course layout, to illustrate a local area of operation and the type of control and monitoring encountered. For those knowledgeable about the art of golf, a typical course includes play in a plurality of areas varying in topography over a predefined area. The varied areas are particularly useful in teaching the invention. The scale of the region is not meant to limit the scope of the invention or other applications that the invention may be for, but merely defines a local operating area. Further, it is to be understood that the phraseology and terminology used herein is for the purpose of description and should not be regarded as limiting. The use of "including," "comprising," or "having" and variations thereof therein is meant to encompass the items listed thereafter and equivalents thereof as well as additional items. The terms "mounted," "connected," and "coupled" are used broadly and encompass both direct and indirect mounting, connecting, and coupling. Further "connected" and "coupled" are not restricted to physical or mechanical connections or couplings.

The invention comprises a system 15 that includes a base station 17 and a remote unit 19. The remote unit 19 is installed in a motorized vehicle 21. To illustrate the use of the invention, the remote unit 19 is installed in a battery powered golf cart 21.

A first embodiment of a base station 17 is shown in FIG. 1. Each base station 17 includes a processor 23 and wireless transceiver 25. The processor 23 includes a CPU 27, memory 29, a reader 31 for reading computer executable instructions on computer readable media, I/O 33, a common communication bus 35, a communication suite 37 with external ports 41 and a GUI (Graphical User Interface) 39. The communication bus 35 allows bi-directional communication between the components of the processor 23. The communication suite 37 and external ports 41 allow bi-directional communication between the processor 23, other processors 23, and external compatible devices such as laptop computers and the like using communication protocols such as IEEE 1394 (FireWire or i.LINK), IEEE 802.3 (Ethernet), RS (Recommended Standard) 232, 422, 423, USB (Universal Serial Bus) and others. The GUI 39 includes a graphics display such as a CRT, fixed-pixel display or others 43, a key pad, keyboard or touchscreen 45 and pointing device 47 such as a mouse, trackball, optical pen or others to provide an easy-to-use, user interface for the invention. The processor 23 can be a handheld device or conventional personal computer such as a PC or Macintosh™ running their appropriate OS (Operating System). The CPU 27 executes compatible instructions or software 49 stored in the memory 29.

The wireless transceiver 25 includes an antenna 51, a radio 53 and a modem 55 for coupling 57 to the processor 23 I/O 33. The transceiver 25 is part of a multiple-access communication system that allows a plurality of users to access the same communication medium to transmit and receive information. The communication medium is referred to as a communication channel 59. Communication techniques such as FDMA (frequency Division Multiple Access), TDMA (Time Division Multiple Access), CSMA (Carrier Sense Multiple Access), CDMA (Code Division Multiple Access) and others allow access to the same communication medium for more than one user. These techniques can be mixed together creating hybrid varieties of multiple access schemes.

The radio 53 adds during transmission, and removes during reception, a carrier signal mixed with the information. The information can include symbols representing voice and data. Depending upon the multiple access scheme, the modem 55 coupled to the radio 53 demodulates a received signal extracting the original sent signal. To transmit, the modem 55 modulates the signal according to the same access scheme prior to transmission. The operating range of the multiple-access communication system is sized for each local area 61. The bi-directional communication channel can be a dedicated radio service or part of a cellular communication network.

Figure 2:
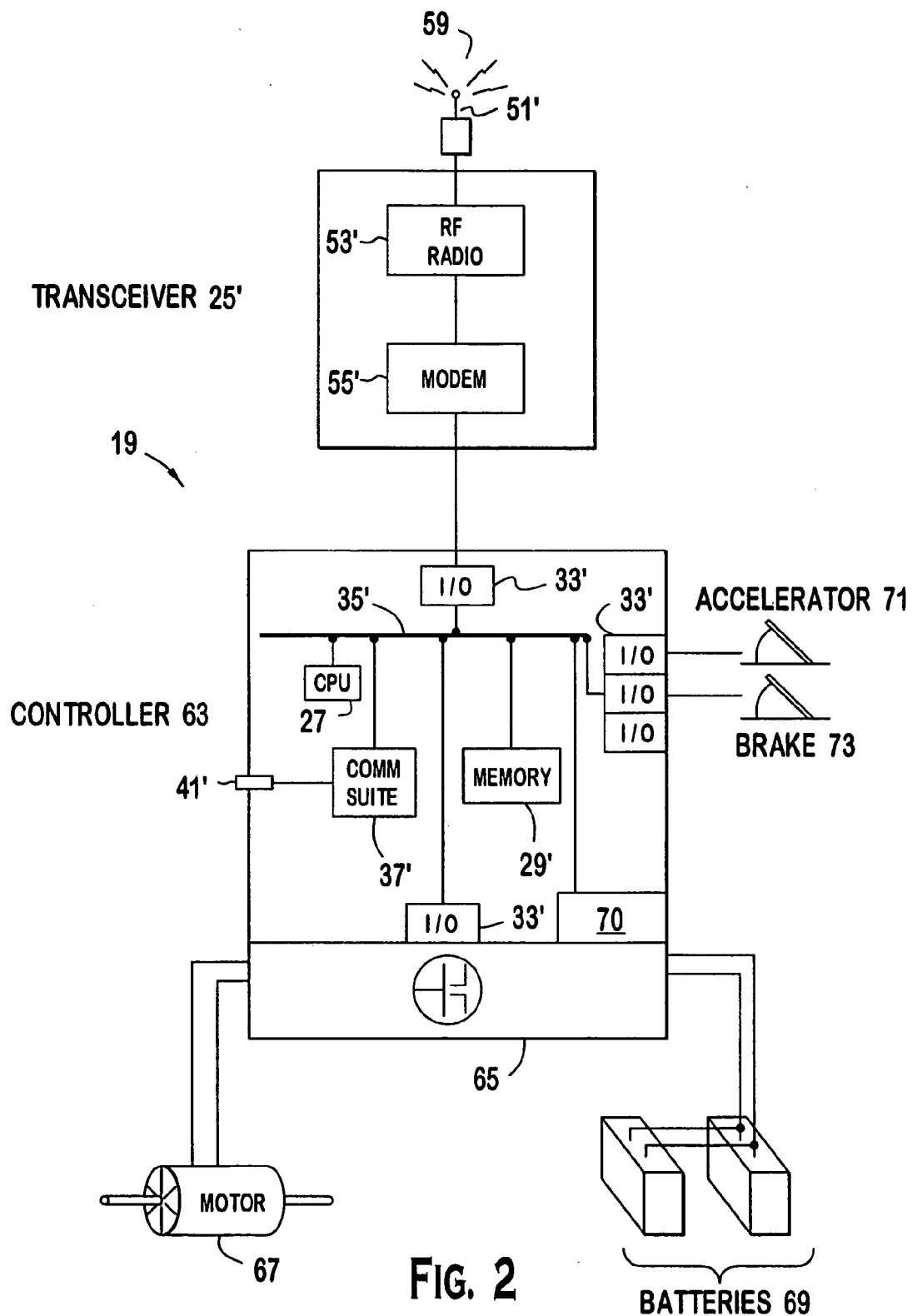
FIG. 2 is a block diagram of an exemplary embodiment of a remote unit in accordance with the invention.

A first embodiment of a remote unit 19 is shown in FIG. 2. The remote unit 19 includes a wireless transceiver 25' including an RF radio 53' and a modem 55', and a controller 63. The controller 63 includes a CPU 27', memory 29', I/O 33', a common communication bus 35', a communication suite 37' with external ports 41' and a motor controller 65. For this embodiment of the invention, the motor controller 65 is configured for use with an electric motor 67 that provides the motive force for the cart 21. The motor controller 65 also provides data acquisition in conjunction with controller 63 I/O. For embodiments using batteries as their energy source, the remote unit 19 includes a port 70 coupled to the motor controller 65 for intelligent battery 69 pack charging. The use of the invention to provide intelligent charging will be described below. Other embodiments of the invention can use motor controllers 65 configured for motors that use petroleum or other energy sources. The remote unit 19 controller 63 CPU 27' executes instructions 49 stored in the memory 29'.

The electric motor controller 65 is preferably a solid-state device containing power semiconductors and transducers for monitoring a plurality of parameters such as current, voltage and temperature that are needed to derive proper motor 67 control signals. PWM (Pulse Width Modulation) is a common method of control where semiconductor switches such as power FETs (Field Effect Transistors) are used to alternately connect then disconnect the power source to the motor 67. The motor controller 65 can be configured to control alternating or direct current.

During normal operation, the controller 63 continuously monitors each system parameter and component of the vehicle 21 to maximize efficiency. Monitoring is controlled by the readable instructions or configured software stored in memory 29. For example, instantaneous motor current, battery 69 voltage, battery state of charge, temperature of the controller circuit, and other parameters are monitored, for the controller 63 CPU 27' to send the appropriate control signals to the PWM FETs 65. Since the controller 63 has processing capability, other signals such as the position of the accelerator 71 and brake 73 pedals (by-wire) can be monitored and used for deriving control signals. The controller 63 monitors various vehicle diagnostic information as will be explained hereinafter. This data can be stored in memory 29' as operating status information and motor controller 65 configuration settings. Each remote unit 19 installed in a vehicle has a unique identification number assigned which is included in transmitted messages. The remote unit 19 transceiver 25' communicates with the base station 17 transceiver 25 over the communication channel 59.

Figure 3:
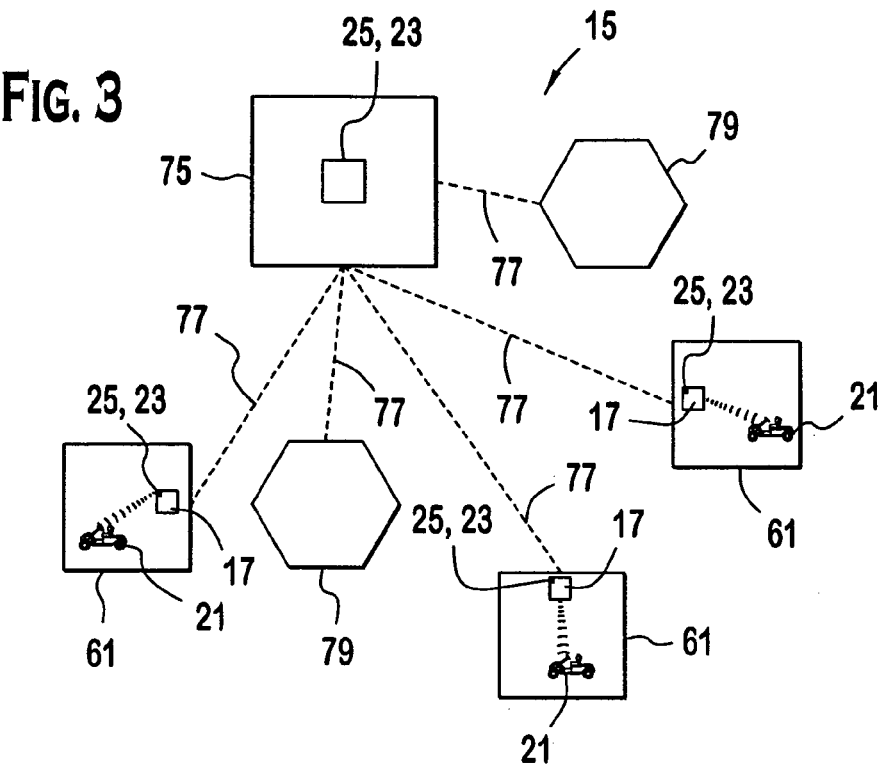
FIG. 3 is an application of a first embodiment of the invention.

Shown in FIG. 3 is a first embodiment of the system 15. At least one electric vehicle 21 with a remote unit 19 installed traverses a local area 61. It is to be understood that the system 15 of the invention can be practiced with a plurality of vehicles 21 having remote units 19 in a plurality of local areas 61. Each vehicle 21 can travel to and from other local areas 61 with handoff occurring. Each vehicle's 21 remote unit 19 communicates with the base station 17 in the local area 61. Each base station 17 is configured to receive and identify diagnostic data belonging to a specific vehicle 21 in its local area 61 over the communication channel 59 and transfer the data to the associated processor 23.

Each base station 17 processor 23 stores the collected data in memory 29. In this embodiment, each base station 17 processor 23 also transfers the data to a central maintenance service center 75. Located at the central maintenance service center 75 is a transceiver 25 and processor 23. From each local 61 base station 17 processor 23, data is transferred to the central service center 75 via a data link 77. The data link 77 can be the communication channel 59 or, a hard-line connection such as a copper wire or optical waveguide used in the classic telephone or Internet infrastructure.

The central maintenance service center 75 monitors the incoming data from the local 61 base stations 17, stores the data, and provides a service indicator when it is determined that one of the vehicles 21 requires immediate service or scheduled, preventive maintenance. The service indicator is logged and displayed 43. The required service for a particular vehicle as determined by the central service center 75 is then communicated to a service center 79 that is nearest to the respective vehicle's area 61, whereby a technician is dispatched to perform the necessary corrective or preventive action.

For example, if one of the vehicles 21 in a local system 61 exhibited the symptoms of a failure of one battery 69 in a battery pack, the onboard controller 63 would sense and flag the problem as a service indicator, preferably using a problem code, and transmit the code to the local base station 17. The base station 17 processor 23 receives the problem code, dates, time stamps and stores the code, displays the problem condition and transmits the code to the central maintenance service center 75 processor 23. Both the local area 61 base station 17 and the central maintenance service center 75 processor 23 are knowledgeable of the condition. Upon receipt, the central service center 75 processor 23 translates the code and schedules the nearest local service center 79 to perform the service required.

The communication from the central maintenance service center 75 to the local service center 77 can be performed manually, for example, by service personnel at the central maintenance service center 75, or can be communicated automatically. That is, upon identification of a service indicator, the central 75 processor 23 is configured to automatically direct and communicate the service indicator to the local service center 79 responsible for servicing the respective local area 61. The central maintenance service centers 75 and local service centers 79 can be assigned to specific makes or types of vehicles 21. For example, if some vehicles 21 in a local area 61 are electric and other vehicles 21 are petroleum powered, the central maintenance service center 75 and local service center 79 can be different for the different technologies, or for the different manufacturers of the vehicles 21.

Figure 4:
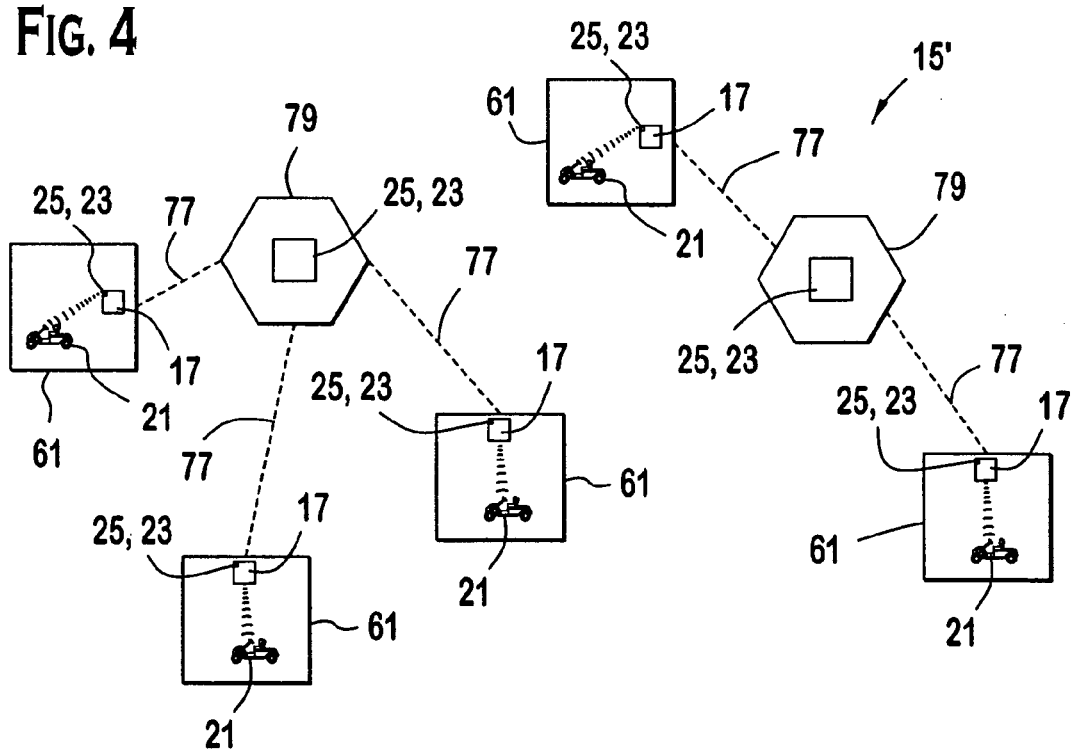
FIG. 4 is an application of a second embodiment of the invention.

A second embodiment of the system of the invention is shown in FIG. 4. The system 15' is substantially the same as the system 15 of the first embodiment, except that the central maintenance service center 75 (FIG. 3) is eliminated. Here, each local 61 base station 17 is linked directly to a local service center 79 via the data link 77. Each local service center 79 serves as a regional service center. The local service center 79 has a processor 23 that is connected via data links 77 to a plurality of local 61 base stations 17 at respective local areas 61. The number of local service centers 79 and the number of local 61 base stations 17 associated with each service center 79 can be varied.

Figure 5:
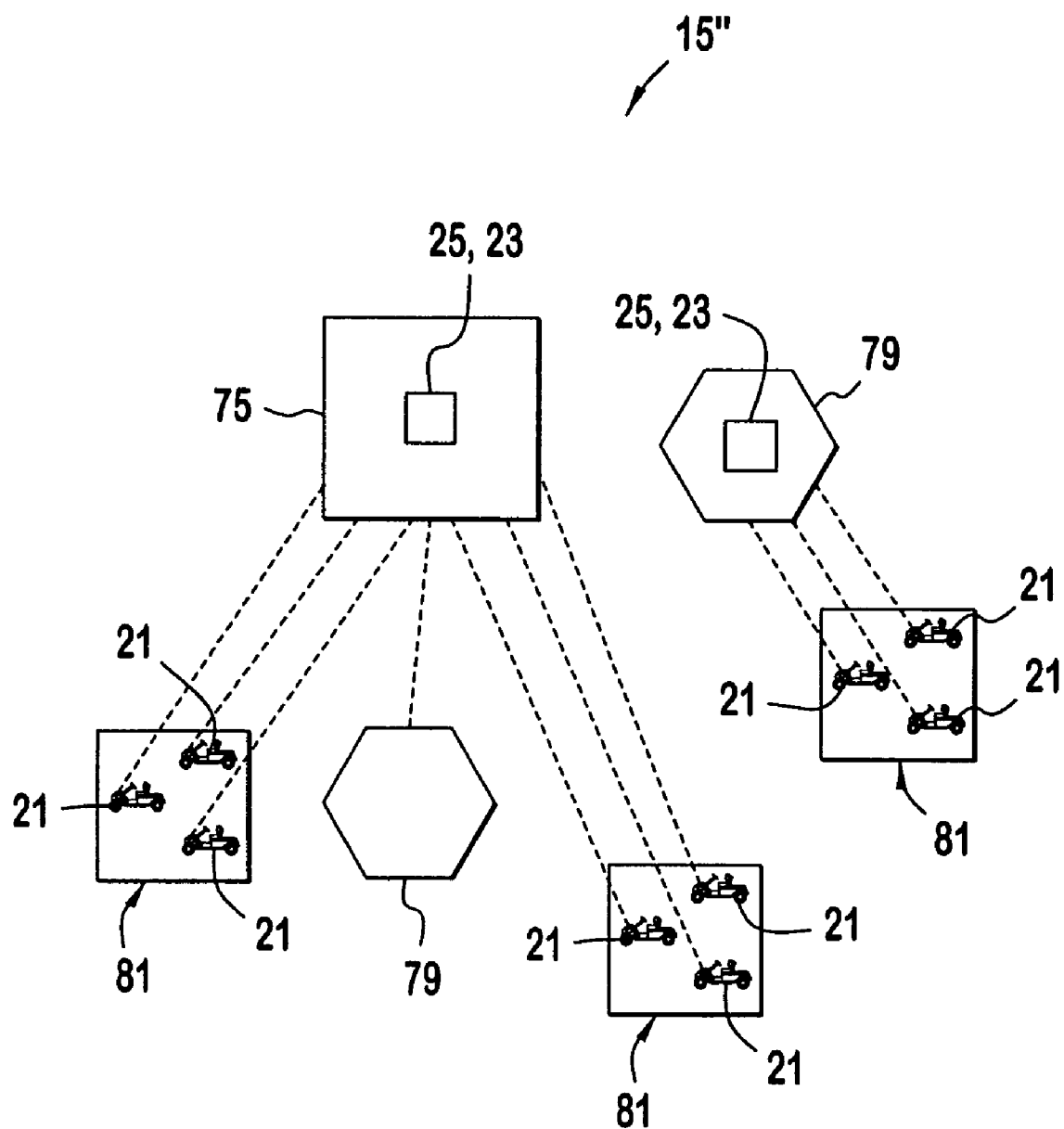
FIG. 5 is an application of a third embodiment of the invention.

A third embodiment of the system of the invention is shown in FIG. 5. The system 15" is substantially the same as the system 15 of the first embodiment, except that the local 61 base station 17 processor 23 is eliminated. Each vehicle 21 transmits directly to a central maintenance service center 75 or a local service center 79. Each vehicle 21 includes a transceiver 25' configured to communicate and transfer data directly to either a central maintenance service center 75 or a local service center 79 processor 23. The system can be configured such that the vehicle communicates at preset times, for example, every morning and every evening, at preset intervals, for example, every twelve hours, or based on some other event, for example, when the vehicle 21 is returned to an assembly area 81. Other communication embodiments between a remote unit 19, base station 15, central maintenance service center 75 and local service center 79 are possible.

Figure 6:
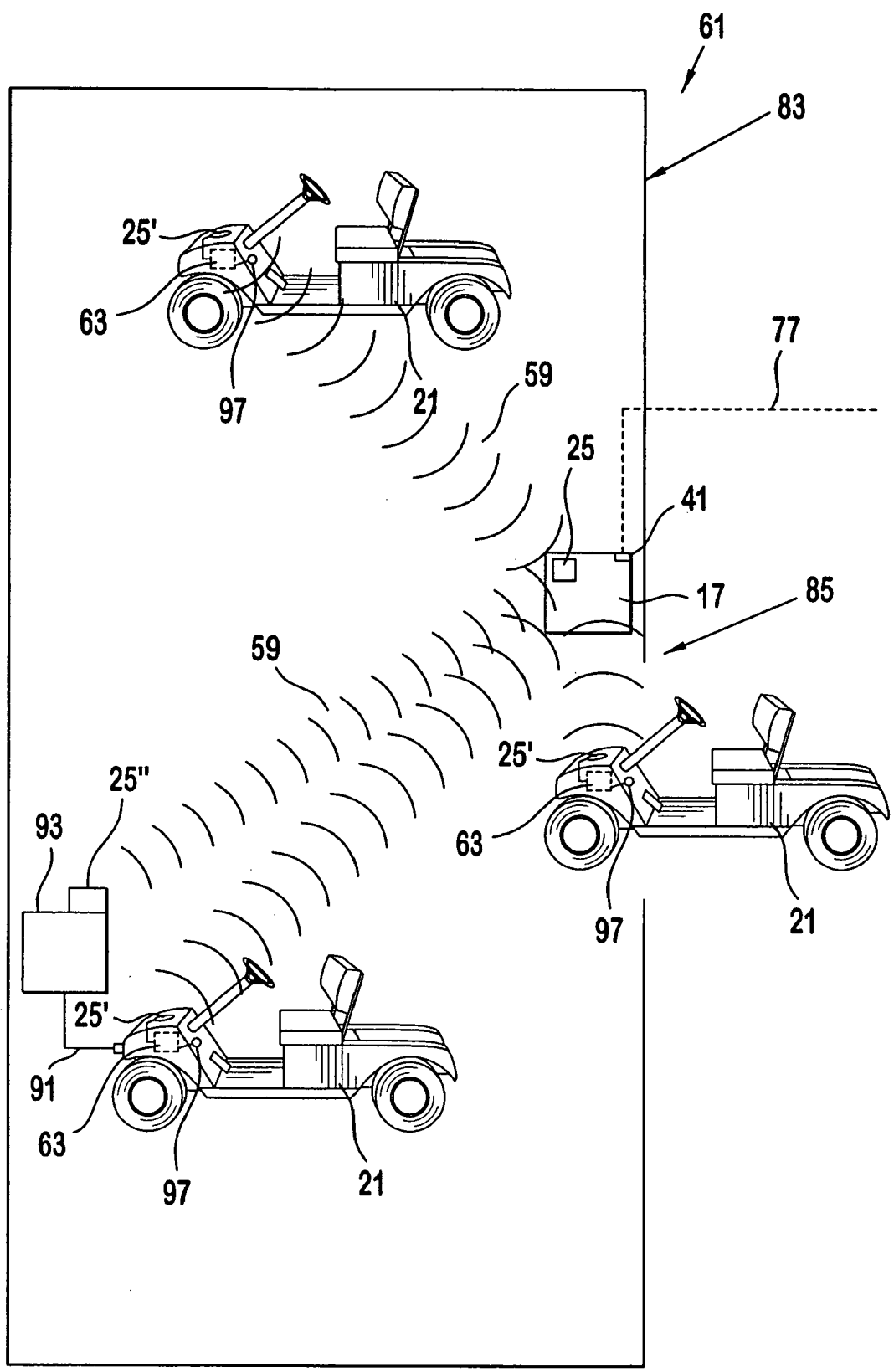
FIG. 6 illustrates a first embodiment of a local monitoring base station in accordance with a first embodiment of the invention.

Referring to FIG. 6, an exemplary local monitoring 61 base station 17 location is shown. For the golf cart 21 example, the location generally includes a storage facility 83 at which a fleet of electric vehicles 21 is stored during off-hours, charged and maintenanced, and a staging area (not shown) where the vehicles 21 are assembled for dispatch. The base station 17 can be located anywhere at the clubhouse or at the storage facility 83. The base station 17 is coupled to the data link 77 via the communication ports 41.

Information pertaining to vehicle performance or required maintenance that is gathered by the controller 63 is transmitted from the vehicle's transceiver 25' to the local 61 base station 17. Bi-directional communication allows information to be transferred from the base station 17 processor 23 to the vehicle controller 63. The base station 17 can therefore poll each vehicle's controller 63 for specific diagnostics such as battery parameters, motor faults, and others, or can convey information of a general nature, for example, course information to be displayed on a vehicle display system, described below.

Figure 7:
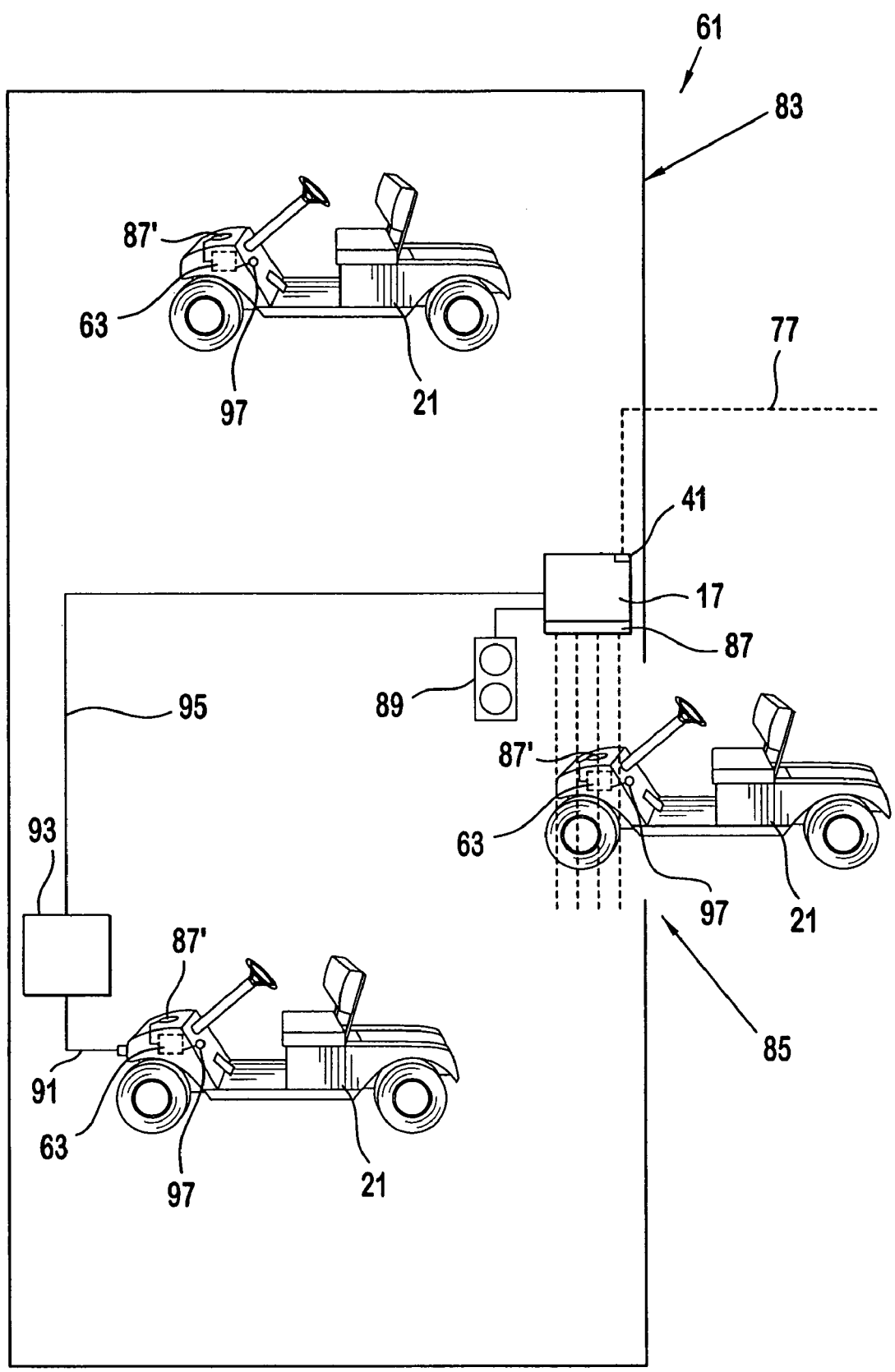
FIG. 7 illustrates a second embodiment of a local monitoring base station in accordance with a first embodiment of the invention.

In second embodiments of the base station 17 and remote 19 units, the embodiment shown in FIG. 7 uses IR (infrared) transceivers 87, 87' in lieu of wireless transceivers 25, 25' to transfer information between the base station 17 and remote 19 units. Since IR communication generally requires a line of sight and has a limited range, each vehicle 21 is positioned at, or driven through a specific location 85 to properly transfer the desired information. A visual or audible signal 89 can be provided to inform the user when the IR communication link has been established, when information transfer is ongoing and when it is completed.

While the illustrated embodiments use RF or IR transceivers, or both, the invention is not limited to such technology and other wireless technologies can be used.

In addition to the above-described communication paths (FIGS. 3, 4, 5, 6 and 7) from each vehicle 21 to a base station 17, equipment used to service a vehicle 21 may be intelligent. For example, the invention is being taught using a fleet of electric golf carts 21 for use at a golf course. At the end of play, or during a round of golf, the battery 69 packs in the carts may require charging. At the storage facility 83, the carts 21 will be coupled via a line 91 to a battery 69 charging station 93. The chargers 93 may be intelligent, and data output by a specific battery charger can be monitored by the local 61 base station 17 via a battery charger 93 transceiver 25" over the communication channel 59 or a hard-line connection 95. Data such as battery state of charge, number of charge cycles the charger performed and other information.

However, the battery 69 chargers located at the storage facility 83 may be basic, housing only a transformer with rectification, outputting a dc source. Since the remote unit 19 controller 63 and motor controller 65 acquires more detailed data pertaining to a specific battery 69 pack (not a charger 93), the battery 69 pack data can be communicated to the local 61 base station 17 processor 23 through the remote unit 19 transceiver 25'.

The data can be manipulated and stored in various manners. For example, the vehicle controller 63 can be configured to gather and process the diagnostic data and thereafter send configured data messages anytime in the local area 61. For example, the controller 63 can filter the diagnostic data and communicate to the user of the vehicle 21 and the operator at the local 61 base station 17 a general vehicle health condition. The health conditions can be indicated as "all systems okay" or "service needed," or alternatively as green, amber and red icons. Vehicles 21 determined to have a healthy charge would show green, vehicles determined to have a marginal charge would show amber and vehicles low on charge would show red. Alternatively, raw data can be transferred from the vehicle controller 63 to the local 61 base station 17. Either the local 61 base station 17 or the central maintenance 75 processor 23 can thereafter process the raw data. In either case, vehicle 21 system status is preferably transmitted from either the local 61 or central 75 processors to the remote unit 19 vehicle controller 63. In that way, an onboard vehicle indicator 97, for example a dashboard display or other indicator, can be used to annunciate and inform the user when the vehicle 21 is in need of service. The operator can then remove the vehicle 21 from the fleet rotation until the necessary service is performed.

A variety of data can be gathered and analyzed. For electric vehicles, an important maintenance parameter is the vehicle's battery 69 condition. The vehicle controller 63 or the local 61 or central 75 processors 23 can be used to analyzed the data and produce diagnostic signals.

For example, during normal operation, current surges of more than 150 amps are typically generated during acceleration after which the motor 67 current falls to 40 or 50 amps. Although the high current surge duration is less than 2 seconds, it is enough time for the controller 63 to monitor battery 69 voltage and calculate the effective internal resistance of the battery 69 pack. Given the initial voltage, SOC (State-of-Charge) estimate from the integrated current, and instantaneous current and voltage during the discharge, the internal resistance of the battery pack (50 milliohms for a series combination of six, 8 Volt, 100 Amp-hour batteries), can be estimated by the controller 65. If either the resistance or equivalent no-load voltage fall outside the usual envelope of expectations, the remote unit 19 controller 63 can indicate the battery 69 as suspicious, store the information in onboard memory 29' and communicate the same to the base station 17. The means of ascertaining battery 69 condition does not have to be perfect, as any indication of batteries 69 that may need service or replacement will be an aid to mechanics that are responsible for a large fleet of up to several hundred vehicles.

In the preferred embodiment, messages transmitted from a vehicle 21 to a base station 17 will contain the vehicle identification number and vehicle information. Vehicle information can contain, for example, battery voltage, battery Amp-hour status, charger plugged in (y/n), and diagnostic codes produced by the controller 63. The base station 17 processor 23 can be programmed to record and display 43 this information in a way that is convenient for the operator. Additional programming may allow data analysis and provide trend advisory, for example, for proper fleet rotation.

The transmitted information can be used for various diagnostic tests. Exemplary tests include: monitoring battery internal resistance and comparing the monitored value to a tabulated or calculated desired value and producing a service indicator signal when the measured resistance is greater than the desired value; monitoring battery pack voltage as a function of current, Amp-hour and temperature producing a service indicator signal when the measured pack value is below a desired value; measuring voltage prior to recharging and producing a service indicator signal when the measured voltage is below a desired value; sending a specific test current to the motor and producing a service indicator signal when the measured battery current and voltage is outside of a desired range; monitoring voltage between batteries and producing a service indicator signal when the measured voltage of a given battery is substantially inconsistent with the value of the other battery voltages; or monitoring dv/dt during battery recovery and producing a service indicator signal when the battery capacitance is low. These diagnostic procedures are provided for illustration only. The invention is not limited to these specific diagnostic evaluations and other diagnostic tests can be performed.

Using the communication channel 59, each vehicle 21 controller 63 forwards the battery status data to the base station 17 processor 23. Since each vehicle 21 has a unique identifier, a profile is maintained for each vehicle 21 and for each vehicle's specific battery 69 pack. The base station 17 processor 23 can therefore determine the Amp-hours removed (discharge) since the last charging cycle. The time required to charge a specific battery 69 pack to full from its discharge level is found empirically from previous charging cycles. At the beginning and end of each charging cycle, the controller 63 records and forwards the Ah measurement to the base station 15 processor 23. Thereafter, the base station 15 processor 23 assembles a charge history for that specific battery 69 pack that can be stored in a LUT (Look-Up Table) resident in the base station processor's 23 memory 29 and in the vehicle's 21 controller 63 memory 29'. The remote unit 19 can be configured to transmit messages to the base station 17 at any time. However, if the communication channel 59 is broken, or not available, data acquisition continues in a default mode until communication with the base station 17 is restored.

With this level of detailed specific data relating to each vehicle 21, the base station 15 processor 23 creates a charging schedule for all vehicles 21 returning to the local area 61 storage facility 83. The charging schedule takes into account the length of time required for the vehicles exhibiting the deepest state of discharge (longest) to vehicles near complete charge (shortest). The charging schedule for a specific vehicle 21 is based upon energy rate ($kWh) information for on-peak and off-peak utility rates, and the length of time to recharge. The base station 17 processor 23 determines a charge initiation window from when off-peak hours start and end, and assigns vehicles 21 exhibiting the deepest state of discharge the earliest start time and those vehicles 21 exhibiting lesser degrees of discharge start times near the end of the window, thereby staggering the load placed on the electrical system. Other factors such as ambient temperature are considered, either increasing or decreasing the expected charging time. Each vehicle's charging start time and period determined by the base station 17 processor 23 is communicated to each vehicle's remote unit 19 controller 63. Upon return to a storage facility 83, maintenance personal couple 91 each vehicle 21 to a charging station 93. The vehicle 21 controller 63 communicates with the base station 17 processor 23, updating information about the state of charge for the batteries 69 in time.

Figure 8A:
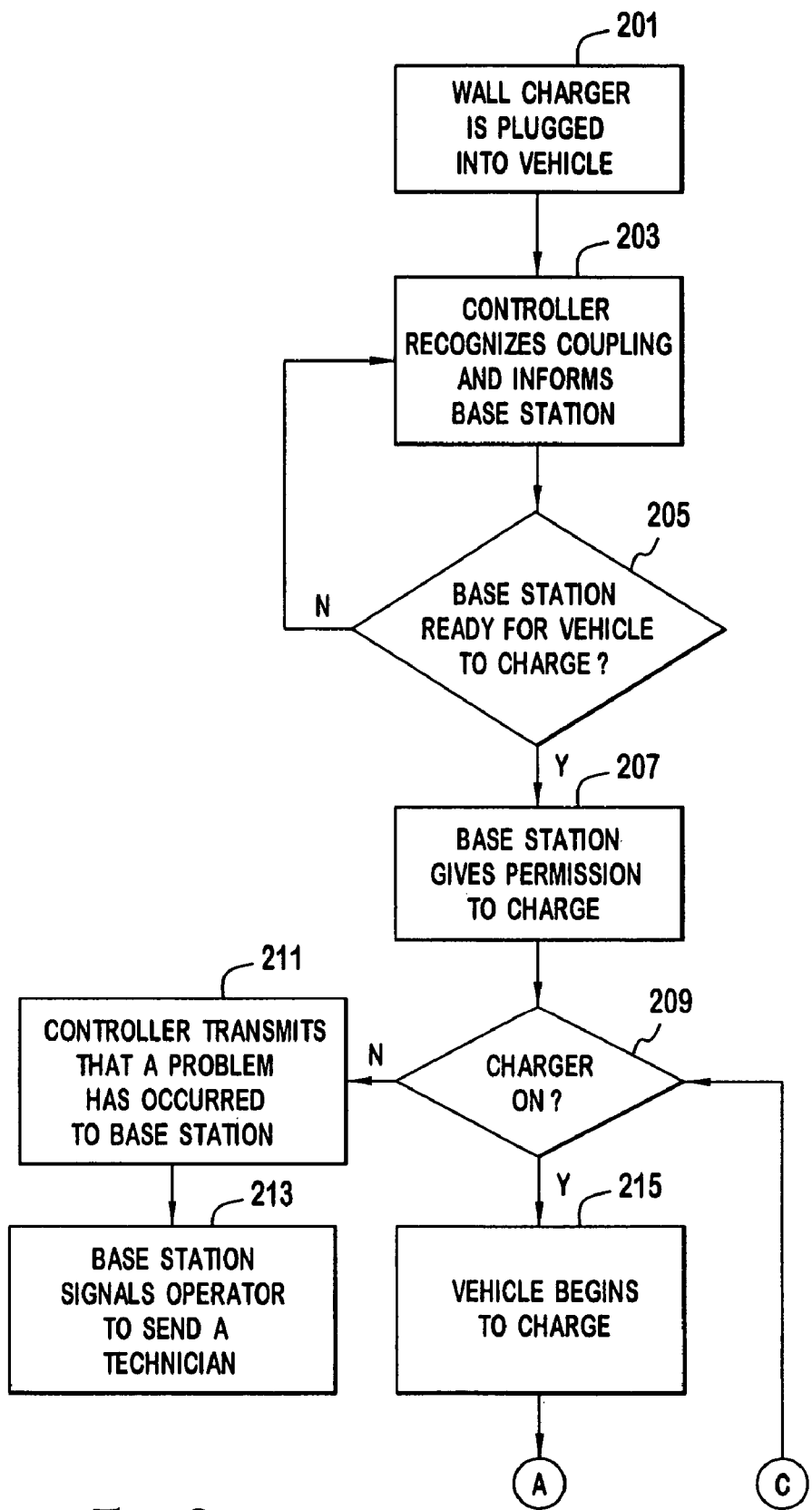
FIGS. 8*a*, 8*b* and 8*c* illustrate the intelligent charging method of the invention.
Figure 8B:
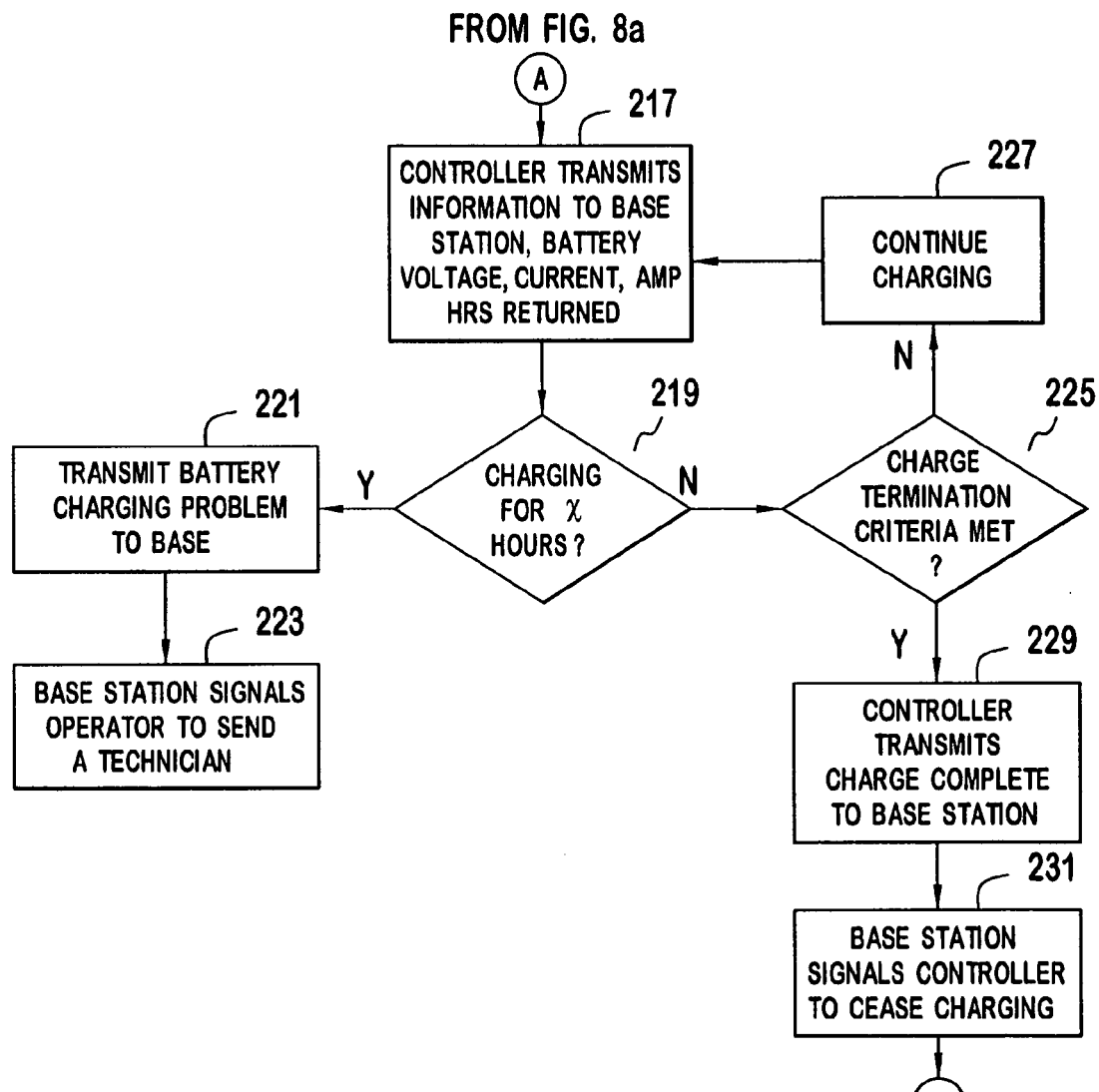
Figure 8C:
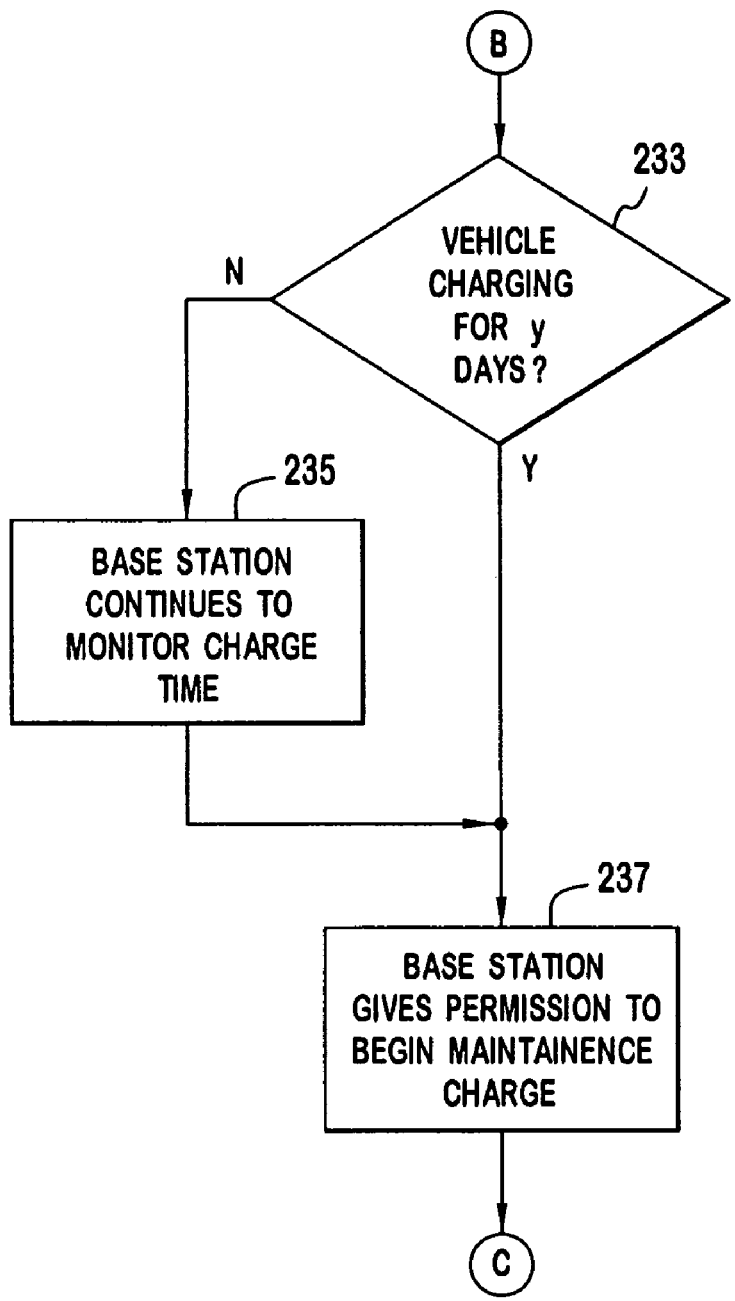

FIGS. 8a, 8b and 8c illustrate the above-described intelligent charging method of the invention. For vehicles 21 using batteries as the energy source, the controller 63 provides an intelligent battery charger function. As described above, the base station 17 processor 23 determines a specific charging schedule for each vehicle 21 and communicates each schedule to the controller 63 of a respective vehicle 21. Upon arriving at the storage facility 83, a basic charger 93 is coupled 91 to the controller 63 charger port 70 (step 201). The vehicle 21 controller 63 senses the coupling with the charger 93 and forwards a message to the base station 17 processor 23 requesting permission to proceed with charging (step 203). The base station 17 processor 23 performs a status check (step 205) for that specific vehicle 21 and if there are no known maintenance concerns, the base station 17 replies with a confirmation to proceed (step 207). The vehicle 21 controller 63 accesses the charging schedule from memory 29', and at the appointed time, begins charging the battery 69 pack (step 209). The vehicle 21 communicates to the base station 17 whether charging is proceeding (step 211), or whether there is a problem (step 211). Depending on the response, the base station 17 logs the start time for that specific battery 69 pack (step 215) or schedules maintenance (step 213). As charging progresses, the vehicle 21 controller 63 can be configured to forward progress messages periodically to the base station 17 (step 217). The controller 63 integrates the time of the charge and monitors for over charging conditions (step 219), for example, if a particular vehicle's 21 battery 69 pack is deeply discharged.

If the period of time is extreme, $\geq x$, where x is determined empirically (in hours), the controller 63 will prohibit further charging and report the time to the base station 17 (step 221). The base station will then schedule corrective action (step 223). Each vehicle's controller 63 monitors the battery 69 pack condition as charging progresses (step 225) and periodically updates the base station 17 (steps 227, 219 and 225). The base station 17 adds the data to the specific battery 69 pack profile in memory 29. If the charging is complete according to the schedule (step 229), the controller 63 sends a message to the base station 17 processor 23 and awaits an instruction to terminate charging (step 231).

Since a vehicle 21 may not be put in service immediately following a charge, or for several days (step 233), the vehicle 21 can remain coupled to a charger if the vehicle 21 is not in current use rotation, or the vehicle 21 may be coupled to a basic charger 93 continuously for a float charge. A float charge is the voltage required to counteract the self-discharge of the battery 69 pack at a certain temperature. The base station 17 processor 23 (step 235) monitors the battery 69 pack. If the battery 69 pack begins to discharge, since the controller 63 periodically updates the base station 17 processor 23 on battery 69 pack status, the base station 17 can commence a new charging period determined by the battery 69 pack profile resident in base station 17 processor 23 memory 29 (step 237).

Figure 9:
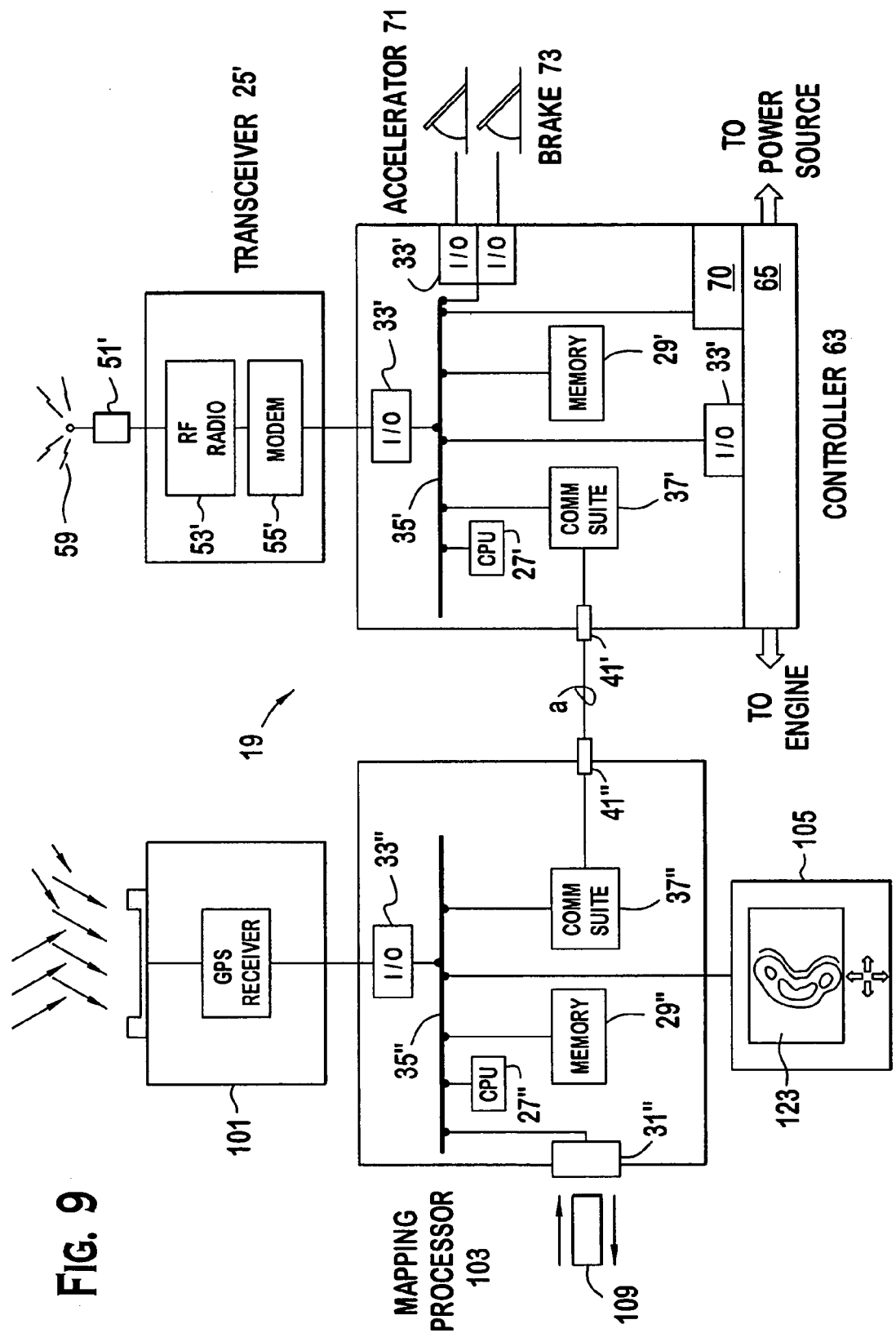
FIG. 9 is a block diagram of another exemplary embodiment of a remote unit in accordance with the invention.
Figure 10:
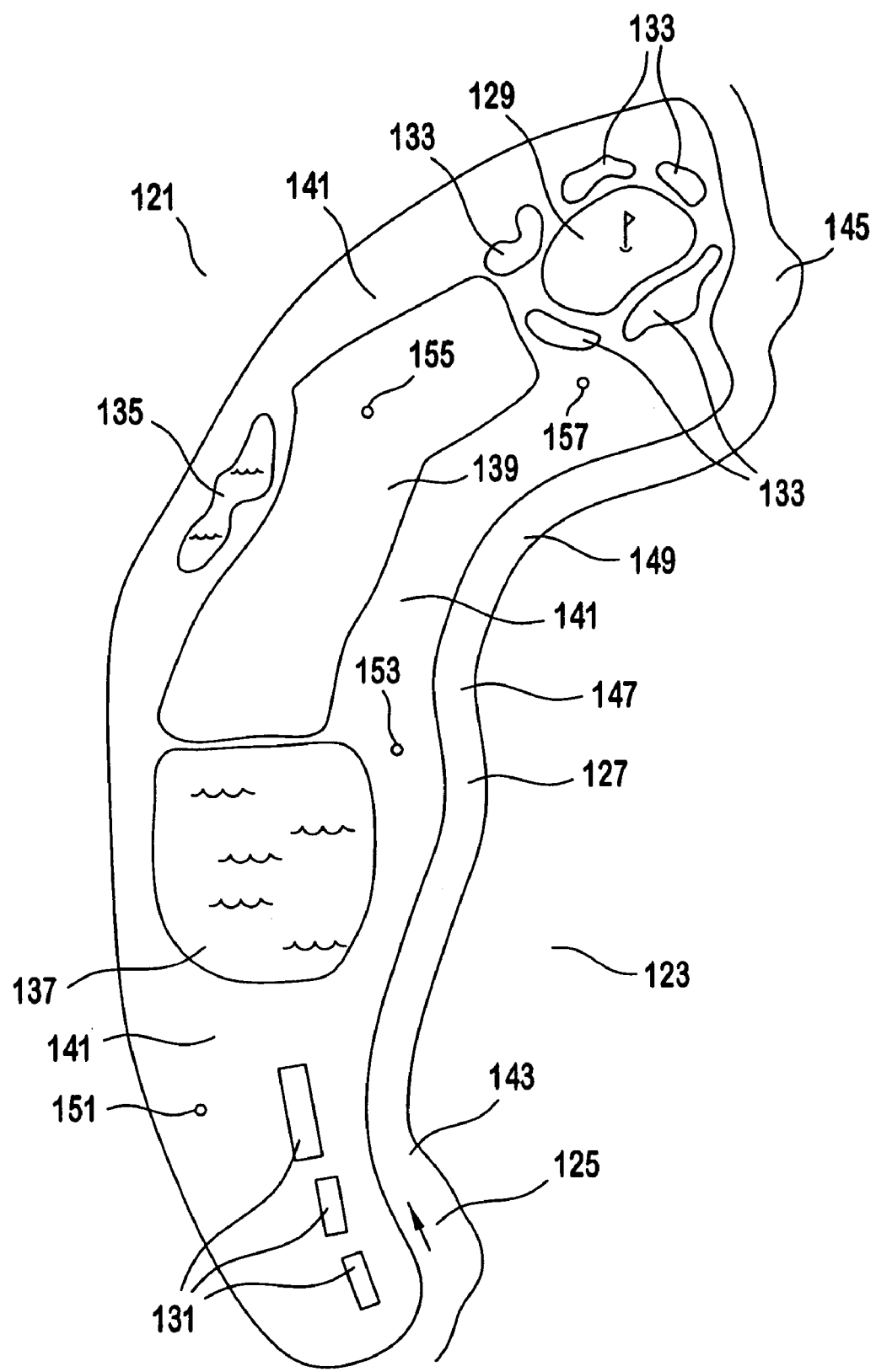
FIG. 10 is a virtual golf hole layout as displayed by the invention.

Shown in FIG. 9 is another embodiment of the remote unit 19 of the invention. The remote unit 19 further includes a GPS receiver 101 and a mapping processor 103. The mapping processor 103 includes a CPU 27", memory 29", a common communication bus 35", a communication suite 37 with external ports 41", a GUI 105 and a reader 31" for reading computer executable instructions on computer readable media 109. The GUI 105 display is any of a variety of fixed-pixel displays having a VGA, XGA or WXGA resolution. The reader 31 can be a drive for magnetic or optical media, a port for a memory card, or others. The mapping processor 103 is coupled to the GPS receiver 101 and to the remote unit 19 controller 63 using the communication suites 37" and ports 41" over line a.

By way of background, the GPS system is a constellation of satellites in earth orbit transmitting signals. There are 24 NAVSTAR (Navigation Signal Timing and Ranging) GPS satellites in operation at all times. Each GPS satellite transmits data that indicates its location and the current time. All GPS satellites synchronize operations so that these repeating signals are transmitted at the same time. The signals, moving at the speed of light, arrive at a GPS receiver at slightly different times because some satellites are farther away than others. The distance to the GPS satellites can be determined by estimating the amount of time it takes for their signals to reach the receiver. When the receiver estimates the distance to at least three GPS satellites, it can calculate its position in two dimensions. When the receiver estimates the distance to at least four GPS satellites, it can calculate its position in three dimensions.

GPS receivers passively receive satellite signals, they do not transmit. GPS receivers require an unobstructed view of the sky, so they are used only outdoors and they often do not perform well within forested areas or near tall buildings. GPS operations depend on a very accurate time reference, which is provided by atomic clocks at the U.S. Naval Observatory. Each GPS satellite has atomic clocks on board.

The accuracy of a position determined with GPS depends on the type of receiver. Receivers that use a method called DGPS (Differential GPS) obtain a higher accuracy. DGPS requires an additional receiver fixed at a known location nearby. Observations made by a stationary receiver are used to correct positions made by roving units, producing accuracy greater than one meter. The present invention uses DGPS.

GPS is used by surveyors and mapmakers for precision positioning and is used to map the location of the local area 61. During data collection, GPS points can be assigned codes to identify them as roads, streams, or other objects, or to define areas within areas. This data can then be compared and analyzed in GIS (Geographic Information System) computer programs. Surveying that previously required hours or even days using conventional methods can be done in minutes with GPS.

A virtual map of a local area 61 is created using GPS and stored on computer readable media 109, and is loaded into the base station 17 processor and remote unit 19 mapping processor 103. The map can be downloaded to the remote unit 19 mapping processor 103 from the base station 17 processor 23 via the communication channel 59 as well.

An example of a virtual map is shown in FIG. 9. In keeping with the golf cart/golf course example, the map 121 is that of a long par 4 golf hole layout 123 as displayed on the mapping processor 103 GUI 105. The display 105 depicts a simplified view of an area 123 within the local area 61 (one hole out of eighteen on the course) whereby a user can zoom in or out using a keypad located on the display 105. The display 105 shows the remote unit 19 or cart 21 location and direction of travel 125 as a unique color or symbol. The display may be configured to show the vehicle position 125 stationary with the area scrolling around the symbol, or have the vehicle position 125 move on the displayed map 123. The size of the viewable area 123 can be adjusted using the cursor keys. The operator can monitor the location of all carts 21 from the base station 17 GUI 39, or apply a filter for carts 21 by user name or that departed within a certain time or by other criteria. The base station 17 processor 23 can be configured to leave "bread crumbs" for a specific vehicle 21 to determine the route taken during a round of golf. Congested or high-use areas can therefore be identified. In this manner, analyzing the routes taken by the fleet over time can perform traffic analysis. The route of a specific vehicle 21 during a specific time such as a partial or full round can be displayed to aid in customer disputes.

In accordance with the teachings of the invention, the golf course has areas that are allowable and restricted. The different areas are denoted on the display using differing colored outlines or fills. One allowable area is the cart path 127 that typically passes through every hole on the course along with associated areas such as the cart storage facility, clubhouse and automobile parking lot. Restricted areas would include the putting green 129, the tee boxes 131, bunkers 133, lateral hazards 135 such as water and woods, and lakes 137, areas of the course under construction or repair and areas outside of property lines. The base station 17 assigns whether an area is allowable or restricted. After the virtual map is created 123, and depending upon the degree of control desired, predefined areas are made addressable and can therefore be changed at will by a course operator. For example, the fairway 139, rough 141 and automobile parking lot (not shown). On days when the fairway conditions are very wet, the course operator may deem play "cart path only" and change the fairways on some holes, or all holes from allowable to restricted. Similarly, some courses do not allow carts to traverse the automobile parking lot. The change can be communicated to all vehicles, or those specifically addressed in the local area 61 over the communication channel 59. The base station 17 processor 23 assigns all areas in the local area 61.

The user operates the cart 21 using conventional means such as the accelerator 71 and brake 73 pedals, forward or reverse switch and steering wheel (not shown). However, transparent to the user, as the user negotiates the course 61, boundary and speed control of the vehicle can be effected by an operator located at the base station, or unintentionally by the driver.

There are four modes of vehicle 21 operation based on a vehicle's 21 position and/or time. First, normal vehicle 21 operation based the remote unit 19 controller 63 default settings. Second, where the motive ability 67 of the vehicle 21 is completely disabled (forward or reverse operation disabled). Third, where the performance of the vehicle 21 is reduced in specific areas of the local area 61 (reduced speed near hazards, cart path). And fourth, restricted area progressive deterrence (hobble mode). The deterrence mode further includes reduced speed, repeated start/stop operations, forward operation disabled and full vehicle 21 disable (forward or reverse operation disabled).

The base station 17 effectively controls the operational status of each vehicle 21 rather than the use of a mechanical key. A cart 21 may only be used after a golfer has paid for the privilege to play at the course and signed-out for a cart 21. The operator then enters a user name and assigns a cart 21 via the base station 17 processor 23 that activates a next available cart 21 via the communication channel 59. The operator can likewise deactivate an individual cart, or all carts from the base station 17 processor 23. For example, securing the storage facility at the end of a day (second operating mode).

Allowable areas of the local area 61 have a speed field assigned to them that can be varied depending upon environmental conditions, topography, weather and others. Continuing with the golf course example, different places on the cart path may have certain "speed limits" imposed depending on location and topography (third operating mode). Cart path areas around tee boxes 143 and greens 145 may have lower speeds than the cart path 147 in-between. Furthermore, if a downhill grade with a curve is experienced 149, a reduced speed zone can be imposed. Regardless of topography or weather, the maximum speed of a cart 21 may be reduced due to a user's age. Other areas where speed can be controlled are in both temporary and permanent restricted areas, temporary and permanent hazard areas, automobile parking lots, storage facilities 83, public areas such as swimming pools, restrooms, club house, etc. and others. Other items in the local area 61 can be identified in the virtual map for use as landmarks having special properties such as sprinkler heads 151, 153, 155, 157.

As long as a user negotiates the course 61 keeping to the cart path 127 or fairway 139, automatic control will not be effected. If a user decides to enter an area that is defined as restricted, such as the putting green 129, automatic control will become apparent.

The fourth operating mode, restricted area progressive deterrence, can be based on sequential entries into one or more restricted areas, and/or continued and persistent violation of a single restricted area. The increasing levels of deterrence are completely configurable and selectable form the base station 17 processor 23.

Figure 11A:
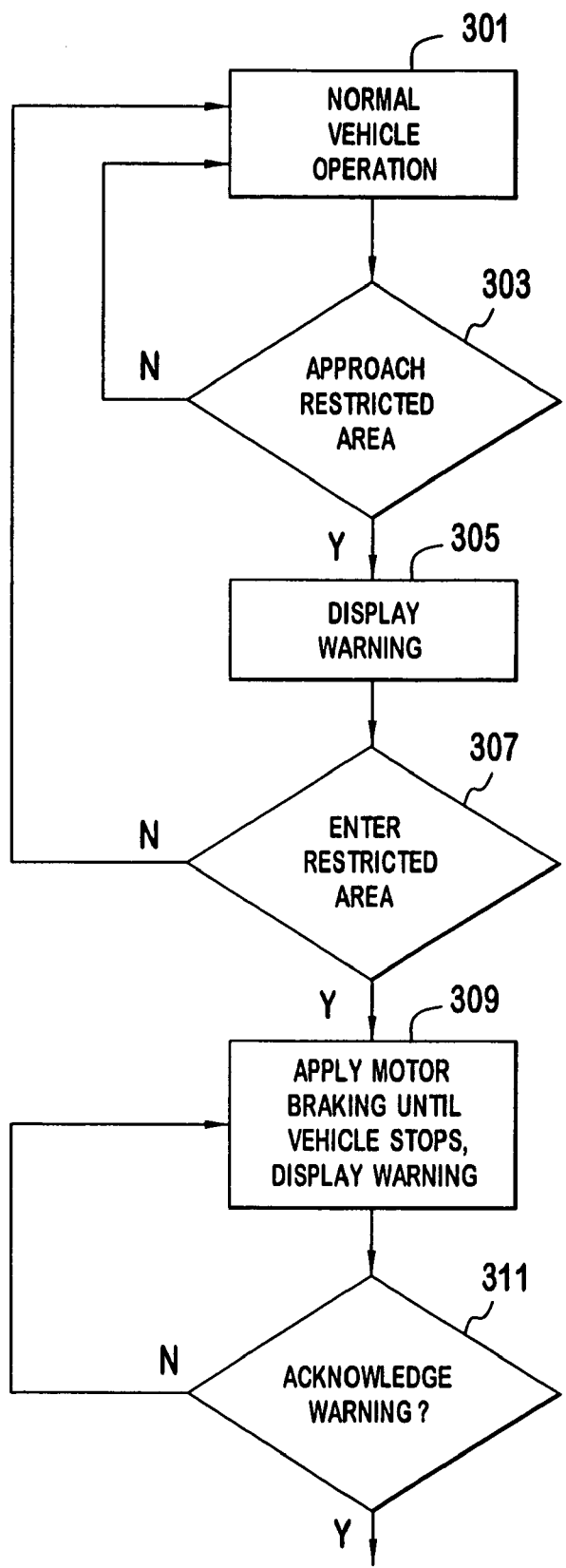
FIGS. 11*a* and 11*b* illustrate the vehicle control method of the invention.
Figure 11B:
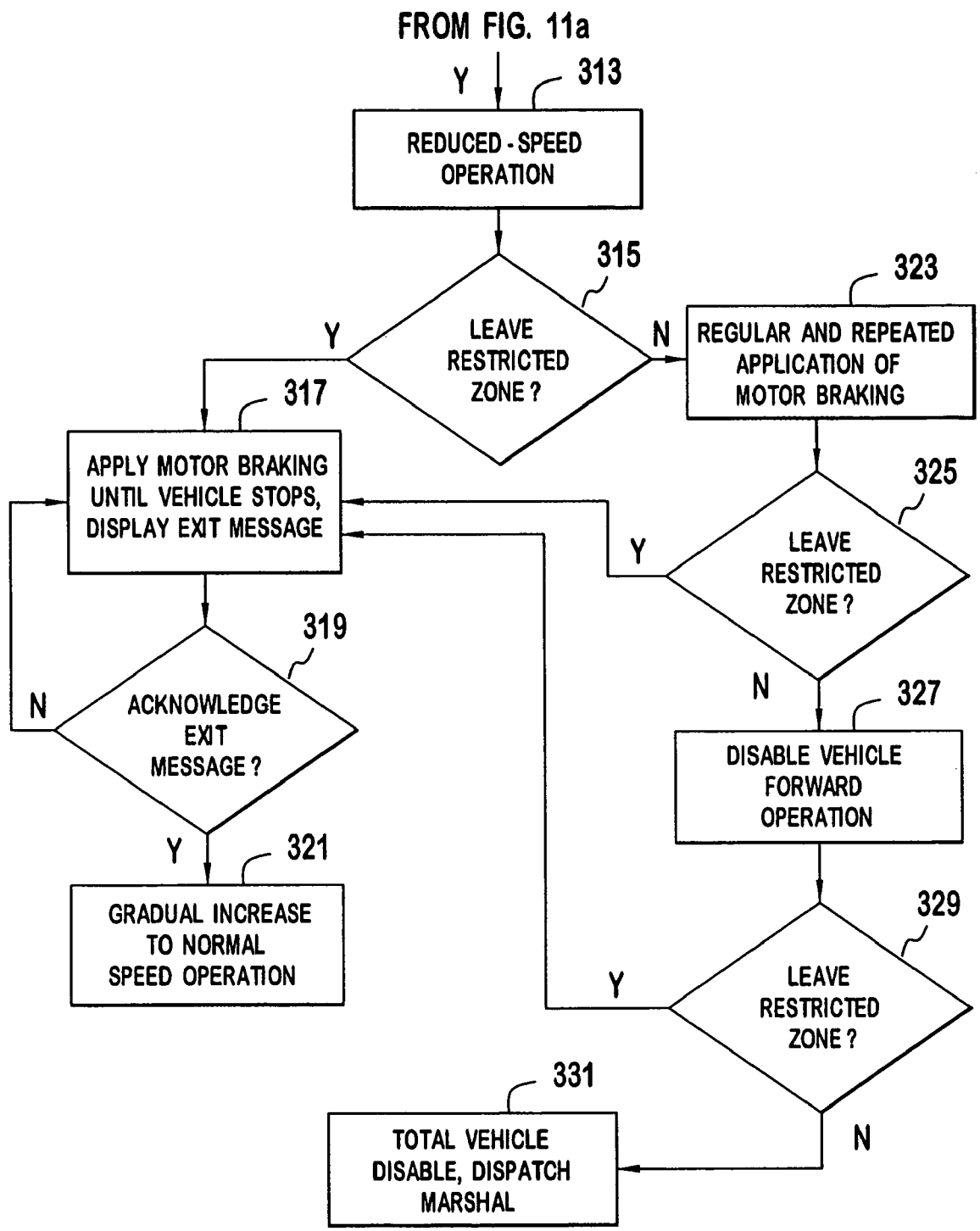

FIGS. 11a and 11b illustrate the fourth mode of operation. The mapping processor 103 calculates a buffer area of varying distance in front of a restricted area boundary depending upon the user's course and speed. If a user steers the vehicle 21 (step 301) on a course that will intersect (step 303) with a restricted area 129, upon entering the buffer zone, a warning (configurable between manual or automatic) will be given in the form of a display and/or tone (step 305). The user has the option of continuing or changing course as prompted by the mapping processor 103. Upon changing direction the warning will cease. If the user continues further (step 307), the mapping processor 103 will signal the controller to apply the vehicle brakes 73 and motor 67 braking in proportion to the vehicle's speed and interrupts motor 67 operation (step 309).

An optional signal can be transmitted at this time from the vehicle 21 to the base station 17 alerting the course operator of the violation. The operator has the option of replying back to the user over the communication channel 59 either by voice or by instruction displayed on the mapping processor 103 GUI 105 (step 309). The message display in response to a violation of the restricted area may also be automated. If the user acknowledges the trespass (step 311), the system can be configured for the operator at the base station 17 to manually reset the operation of the vehicle 21 in order for it to exit the restricted area, or this reset can be automatic (step 313). The speed can be reduced while exiting the restricted area.

When leaving (step 315) the restricted area the vehicle will come to a rest for the user to acknowledge the exiting of the restricted area and a return to normal default speed (step 317). Since the vehicle 21 speed was reduced while exiting the restricted area, the acknowledgement is to obviate a sudden, unexpected increase in speed when crossing into an allowable area. After the user acknowledges the exit message (step 319), vehicle 21 speed will increase (step 321) to the default remote unit 19 controller 63 setting.

If the user persists in remaining, or negotiating in the restricted area (step 315), the vehicle 21 will come to rest again via automatic application of motor and/or mechanical braking (step 323). An optional signal may be sent from the vehicle 21 at this time to the base station 17 alerting the course operator of the continued violation. The operator will reply back to the user over the communication channel 59 either by voice or by instruction displayed on the mapping processor 103 GUI 105 (step 325). The deterrence mode can also be configured for an automated response to this continued violation. If the user acknowledges the trespass, the operator can manually, or the system can automatically reset operation of the vehicle 21 in order for the user to exit the restricted area (step 317).

In keeping with the concept of progressive deterrence, if the user continues to violate the restricted area, even after the vehicle has been brought to a stop with an alert message displayed, the system can respond automatically or the base station operator can manually respond to this continued violation by causing a repeated and regular stop/start operation to be set up in the vehicle. This repeated and regular stop/start operation would be accomplished by the automatic application of the vehicle motor braking or mechanical brake until the vehicle has been brought to stop (step 323). At this point, a message will again warn the user of the violation and require acknowledgment before releasing the brakes. This sequence can then be repeated at configurable time or distance intervals to yield a continuous series of starts and stops which acts as a higher level of deterrence (step 325).

Yet an even higher level of deterrence can be established in response to continued violation by disabling the forward motion of the vehicle (manually or automatically) along with messages and required acknowledgements (step 327). The deterrence nature of this technique is in the form of forcing the user to back out of a restricted area with the vehicle in reverse (step 329).

A final level of deterrence takes the form of a total disabling of the vehicle (both forward and reverse operation) in conjunction with the dispatching of a course marshal to personally enforce the restricted area (step 331). All of the deterrence levels up to this point give the user the ability to leave the restricted area albeit at reduced vehicle operation or "hobbled modes" of operation. This final deterrence level is implemented for users who flagrantly violate the restricted area. In these cases, the system totally disables the vehicle.

Each vehicle 21 will have an emergency override that will allow the vehicle 21 to operate in the normal mode of operation regardless if in a restricted area (possibly with the exception of hazard areas). The override allows users to travel with haste to a desired location during times of emergency or duress, for example, when in need of medical attention or impending weather conditions. Activation of the override will send a message to the base station 17 processor 23.

The base station 17 located in an area such as the proshop will display vehicle status such as: vehicle missing, no vehicle communications, vehicle position, vehicle health (green, amber, or red; possibly augmented with specific fault(s)), vehicle 21 in restricted area alert, vehicle lockdown (y/n), vehicle fault condition (specific fault(s) as opposed to general health), and others.

The base station 17 processor 23 communication suite 37 and ports 41 can be used to output all of the information described above to other processors, and also allows for connectivity to other intelligent devices. One application in keeping with the golf course theme is to provide input to a sprinkler system (not shown). While prior art sprinkler systems range from the entire course being timer controlled, to localized zone RF control, the invention can identify each sprinkler head on the course and export the information to a central sprinkler controller. As a cart 21 approaches a sprinkler head 151, 153, 155, 157, since the base station 17 processor 23 knows the location of the cart 21 and sprinkler, it outputs a signal to the sprinkler controller in a compatible protocol whereby the sprinkler controller can suspend operation for that sprinkler or all sprinklers servicing that hole while a cart 21 is present or for a predetermined period of time.

Another variant on using the base station 17 information is to create a user profile. The base station 17 would keep a record of a user's name, address, etc., but also a list of personal information. The information could range from music choices, to vehicle speed preferences, to other services regarding hole location. Perhaps a user desires a meal query before the turn, or a particular music selection for each hole. Providing the requisite intelligent device downstream of the base station 17 can accommodate these services.

Another variant would guard for vehicle 21 collisions. Since the base station 17 monitors the location of all carts 21, in conjunction with the aforementioned modes of vehicle control, the base station can prevent collisions. By plotting a course vector and speed for each cart 21, the base station can effect motor and/or mechanical braking if a collision is imminent.

Yet another variant of monitoring cart 21 position would allow for the changing of one motive source to another. For example, hybrid vehicles 21 operating on either electrical or petroleum can change automatically in dependence upon local area 61 location. If an allowable region were deemed to be ultra quiet, electric operation would be used solely in that region.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the invention as defined by the appended claims.

What is claimed is:

1. A method of scheduling the charging of battery-powered vehicles in a fleet of vehicles, the method comprising:

obtaining battery related information, including depth of discharge, for a specific vehicle in said fleet using a controller;

transmitting said battery related information from said specific vehicle to a base station;

receiving said battery related information at said base station;

storing said battery related information for said specific vehicle at said base station;

determining a charge schedule for said specific vehicle from said stored battery related information at said base station, said specific vehicle being non-operational during charging; and transmitting said charge schedule from said base station to said specific vehicle controller;

wherein determining said charge schedule is based at least in part on a length of time required to charge said specific vehicle relative to other vehicles in said fleet, wherein determining said charging schedule includes charging said specific vehicle earlier than other vehicles having less depth of discharge.

2. The method of claim 1, further comprising determining said length of time required to recharge said specific vehicle based on previous charging cycles.

3. The method of claim 1, wherein determining said charge schedule is based at least in part on energy rates during on-peak utility hours and off-peak utility hours.

4. The method of claim 3, further comprising:

determining a charge initiation window during said off-peak utility hours, and assigning a vehicle of said fleet exhibiting a deeper state of discharge a charge start time earlier within said charge initiation window than a vehicle of said fleet exhibiting a lesser degree of discharge.

5. The method of claim 1, wherein determining said charge schedule is based at least in part on ambient temperature.

6. The method of claim 1, wherein obtaining said battery related information includes obtaining a charge level of a battery in said specific vehicle using said controller.

7. A scheduling system for charging battery-powered vehicles in a fleet of vehicles, the scheduling system comprising:
    means for obtaining battery related information, including depth of discharge, for a specific vehicle in said fleet using a controller;
    means for transmitting said battery related information from said specific vehicle to a base station;
    means for receiving said battery related information at said base station;
    means for storing said battery related information for said specific vehicle;
    means for determining a charge schedule for said specific vehicle from said stored battery related information at said base station, said specific vehicle being non-operational during charging; and
    means for transmitting said charge schedule from said base station to said specific vehicle controller;
    wherein said charge schedule is based at least in part on a length of time required to charge said specific vehicle relative to other vehicles in said fleet, wherein determining said charging schedule includes charging said specific vehicle earlier than other vehicles having less depth of discharge.

8. The scheduling system of claim 7, wherein said length of time required to charge said specific vehicle is based on previous charging cycles of said vehicle.

9. The scheduling system of claim 7, wherein said charge schedule is based at least in part on energy rates during on-peak: utility hours and off-peak utility hours.

10. The scheduling system of claim 9, wherein said means for determining said charge schedule also determines a charge initiation window during said off-peak utility hours, and wherein a vehicle of said fleet exhibiting a deeper state of discharge is assigned a charge start time earlier within said charge initiation window than a vehicle of said fleet exhibiting a lesser degree of discharge.

11. The scheduling system of claim 7, wherein said charge schedule is based at least in part on ambient temperature.

12. The scheduling system of claim 7, wherein said battery related information includes a charge level of a battery in said specific vehicle.

13. A method of scheduling the charging of battery-powered vehicles in a fleet of vehicles, the method comprising:
    obtaining battery related information, including depth of discharge, for a specific vehicle in said fleet using a charger;
    transmitting said battery related information from said charger to a base station;
    receiving said battery related information at said base station;
    storing said battery related information for said specific vehicle at said base station;
    determining a charge schedule for said specific vehicle from said stored battery related information at said base station, said specific vehicle being non-operational during charging; and
    transmitting said charge schedule from said base station to said charger;
    wherein determining said charge schedule is based at least in part on a length of time required to charge said specific vehicle relative to other vehicles in said fleet, wherein determining said charging schedule includes charging said specific vehicle earlier than other vehicles having less depth of discharge.

14. The method of claim 13, further comprising determining said length of time required to recharge said specific vehicle based on previous charging cycles.

15. The method of claim 13, wherein determining said charge schedule is based at least in part on energy rates during on-peak: utility hours and off-peak utility hours.

16. The method of claim 15, further comprising:
    determining a charge initiation window during said off-peak utility hours, and assigning a vehicle of said fleet exhibiting a deeper state of discharge a charge start time earlier within said charge initiation window than a vehicle of said fleet exhibiting a lesser degree of discharge.

17. The method of claim 13, wherein determining said charge schedule is based at least in part on ambient temperature.

18. The method of claim 13, wherein obtaining said battery related information includes obtaining a charge level of a battery in said specific vehicle using said charger.

19. A scheduling system for charging battery-powered vehicles in a fleet of vehicles, the scheduling system comprising:
    means for obtaining battery related information, including depth of discharge, for a specific vehicle in said fleet using a charger;
    means for transmitting said battery related information from said charger to a base station;
    means for receiving said battery related information at said base station;
    means for storing said battery related information for said specific vehicle;
    means for determining a charge schedule for said specific vehicle from said stored battery related information at said base station, said specific vehicle being non-operational during charging; and
    means for transmitting said charge schedule from said base station to said charger;
    wherein said charge schedule is based at least in part on a length of time required to charge said specific vehicle relative to other vehicles in said fleet, wherein determining said charging schedule includes charging said specific vehicle earlier than other vehicles having less depth of discharge.

20. The scheduling system of claim 19, wherein said length of time required to charge said specific vehicle is based on previous charging cycles of said vehicle.

21. The scheduling system of claim 19, wherein said charge schedule is based at least in part on energy rates during on-peak utility hours and off-peak utility hours.

22. The scheduling system of claim 21, wherein said means for determining said charge schedule also determines a charge initiation window during said off-peak utility hours, and wherein a vehicle of said fleet exhibiting a deeper state of discharge is assigned a charge start time earlier within said start of said charge initiation window than a vehicle of said fleet exhibiting a lesser degree of discharge.

23. The scheduling system of claim 19, wherein said charge schedule is based at least in part on ambient temperature.

24. The scheduling system of claim 19, wherein said battery related information includes a charge level of a battery in said specific vehicle.

25. A method of scheduling the charging of battery-powered vehicles in a fleet of vehicles, the method comprising:
obtaining battery related information, including depth of discharge, for a specific vehicle in said fleet using a controller;
transmitting said battery related information from said specific vehicle to a base station;
receiving said battery related information at said base station;
storing said battery related information for said specific vehicle at said base station;
determining a charge schedule for said specific vehicle from said stored battery related information at said base station, said charge schedule based on a length of time required to charge said specific vehicle relative to other vehicles in said fleet, and at least one of energy rates during on-peak utility hours and off-peak utility hours, and ambient temperature; wherein determining said charging schedule includes charging said specific vehicle earlier than other vehicles having less depth of discharge; and
transmitting said charge schedule from said base station to said specific vehicle controller.

26. The method of claim 25, further comprising determining said length of time required to recharge said specific vehicle based on previous charging cycles.

27. The method of claim 25, further comprising:
determining a charge initiation window during said off-peak utility hours, and assigning a vehicle of said fleet exhibiting a deeper state of discharge a charge start time earlier within said charge initiation window than a vehicle of said fleet exhibiting a lesser degree of discharge.

28. The method of claim 25, wherein said specific vehicle is non-operational during charging.

29. The method of claim 25, wherein obtaining said battery related information includes obtaining a charge level of a battery in said specific vehicle using said controller.

30. A scheduling system for charging battery-powered vehicles in a fleet of vehicles, the scheduling system comprising:
means for obtaining battery related information, including depth of discharge for a specific vehicle in said fleet using a controller;
means for transmitting said battery related information from said specific vehicle to a base station;
means for receiving said battery related information at said base station;
means for storing said battery related information for said specific vehicle;
means for determining a charge schedule for said specific vehicle from said stored battery related information at said base station, said charge schedule based on a length of time required to charge said specific vehicle relative to other vehicles in said fleet, and at least one of energy rates during on-peak utility hours and off-peak utility hours, and ambient temperature; wherein determining said charging schedule includes charging said specific vehicle earlier than other vehicles having less depth of discharge; and
means for transmitting said charge schedule from said base station to said specific vehicle controller.

31. The scheduling system of claim 30, wherein said length of time required to recharge said specific vehicle is based on previous charging cycles.

32. The scheduling system of claim 30, wherein said means for determining said charge schedule also determines a charge initiation window during said off-peak utility hours, and wherein a vehicle of said fleet exhibiting a deeper state of discharge is assigned a charge start time earlier within said charge initiation window than a vehicle of said fleet exhibiting a lesser degree of discharge.

33. The scheduling system of claim 30, wherein said specific vehicle is non-operational during charging.

34. The scheduling system of claim 30, wherein said battery related information includes a charge level of a battery in said specific vehicle.

35. A method of scheduling the charging of battery-powered vehicles in a fleet of vehicles, the method comprising:
obtaining battery related information, including depth of discharge, for a specific vehicle in said fleet using a charger;
transmitting said battery related information from said charger to a base station;
receiving said battery related information at said base station;
storing said battery related information for said specific vehicle at said base station;
determining a charge schedule for said specific vehicle from said stored battery related information at said base station, said charge schedule based on a length of time required to charge said specific vehicle relative to other vehicles in said fleet, and at least one of energy rates during on-peak utility hours and off-peak utility hours, and ambient temperature; wherein determining said charging schedule includes charging said specific vehicle earlier than other vehicles having less depth of discharge; and
transmitting said charge schedule from said base station to said charger.

36. The method of claim 35, further comprising determining said length of time required to recharge said specific vehicle based on previous charging cycles.

37. The method of claim 35, further comprising:
determining a charge initiation window during said off-peak utility hours, and assigning a vehicle of said fleet exhibiting a deeper state of discharge a charge start time earlier within said charge initiation window than a vehicle of said fleet exhibiting a lesser degree of discharge.

38. The method of claim 35, wherein said specific vehicle is non-operational during charging.

39. The method of claim 35, wherein obtaining said battery related information includes obtaining a charge level of a battery in said specific vehicle using said charger.

40. A scheduling system for charging battery-powered vehicles in a fleet of vehicles, the scheduling system comprising:
means for obtaining battery related information, including depth of discharge, for a specific vehicle in said fleet using a charger;
means for transmitting said battery related information from said charger to a base station;
means for receiving said battery related information at said base station;
means for storing said battery related information for said specific vehicle;
means for determining a charge schedule for said specific vehicle from said stored battery related information at said base station, said charge schedule based on a length of time required to charge said specific vehicle relative to other vehicles in said fleet, and at least one of energy rates during on-peak utility hours and off-peak utility hours, and ambient temperature; wherein determining said charging schedule includes charging said specific vehicle earlier than other vehicles having less depth of discharge; and means for transmitting said charge schedule from said base station to said charger.

41. The scheduling system of claim 40, wherein said length of time required to recharge said specific vehicle is based on previous charging cycles.

42. The scheduling system of claim 40, wherein said means for determining said charge schedule also determines a charge initiation window during said off-peak utility hours, and wherein a vehicle of said fleet exhibiting a deeper state of discharge is assigned a charge start time earlier within said charge initiation window than a vehicle of said fleet exhibiting a lesser degree of discharge.

43. The scheduling system of claim 40, wherein said specific vehicle is non-operational during charging.

44. The scheduling system of claim 40, wherein said battery related information includes a charge level of a battery in said specific vehicle.

* * * * *

UNITED STATES PATENT AND TRADEMARK OFFICE
CERTIFICATE OF CORRECTION

| | |
|---|---|
| PATENT NO. | : 7,778,746 B2 |
| APPLICATION NO. | : 10/508046 |
| DATED | : August 17, 2010 |
| INVENTOR(S) | : Paul W. McLeod et al. |

Page 1 of 1

It is certified that error appears in the above-identified patent and that said Letters Patent is hereby corrected as shown below:

Col. 15, Claim 9, line 3, "on-peak: utility hours" should read --on-peak utility hours--.

Col. 16, Claim 15, line 3, "on-peak: utility hours" should read --on-peak utility hours--.

Col. 17, Claim 30, line 5, "depth of discharge for" should read --depth of discharge, for--.

Signed and Sealed this
Fifth Day of April, 2011

David J. Kappos
*Director of the United States Patent and Trademark Office*

UNITED STATES PATENT AND TRADEMARK OFFICE
CERTIFICATE OF CORRECTION

PATENT NO. : 7,778,746 B2  
APPLICATION NO. : 10/508046  
DATED : August 17, 2010  
INVENTOR(S) : Paul W. McLeod et al.

Page 1 of 1

It is certified that error appears in the above-identified patent and that said Letters Patent is hereby corrected as shown below:

Col. 15, line 40 (Claim 9, line 3) "on-peak: utility hours" should read --on-peak utility hours--.

Col. 16, line 14 (Claim 15, line 3) "on-peak: utility hours" should read --on-peak utility hours--.

Col. 17, line 47 (Claim 30, line 5) "depth of discharge for" should read --depth of discharge, for--.

This certificate supersedes the Certificate of Correction issued April 5, 2011.

Signed and Sealed this  
Third Day of May, 2011

David J. Kappos  
*Director of the United States Patent and Trademark Office*